United States Patent
Adams et al.

(10) Patent No.: US 12,496,815 B2
(45) Date of Patent: Dec. 16, 2025

(54) MULTILAYER POROUS MEMBRANES AND METHODS OF MAKING THE SAME

(71) Applicant: Celgard, LLC, Charlotte, NC (US)

(72) Inventors: Changqing Wang Adams, Fort Mill, SC (US); David Anzini, Fort Mill, SC (US)

(73) Assignee: Celgard, LLC, Charlotte, NC (US)

( * ) Notice: Subject to any disclaimer, the term of this patent is extended or adjusted under 35 U.S.C. 154(b) by 180 days.

(21) Appl. No.: 18/012,915

(22) PCT Filed: Jul. 5, 2021

(86) PCT No.: PCT/US2021/040395
§ 371 (c)(1),
(2) Date: Dec. 24, 2022

(87) PCT Pub. No.: WO2022/010814
PCT Pub. Date: Jan. 13, 2022

(65) Prior Publication Data
US 2023/0294387 A1    Sep. 21, 2023

Related U.S. Application Data

(60) Provisional application No. 63/048,661, filed on Jul. 7, 2020.

(51) Int. Cl.
*B32B 27/32* (2006.01)
*B32B 27/08* (2006.01)
(Continued)

(52) U.S. Cl.
CPC .............. *B32B 27/32* (2013.01); *B32B 27/08* (2013.01); *B32B 27/205* (2013.01);
(Continued)

(58) Field of Classification Search
None
See application file for complete search history.

(56) References Cited

U.S. PATENT DOCUMENTS

2008/0045638 A1 * 2/2008 Chapman ................ C08L 23/10
524/425
2018/0309105 A1 * 10/2018 Ra ........................ H01M 50/406
(Continued)

FOREIGN PATENT DOCUMENTS

WO    WO-2019217791 A2 * 11/2019 ......... B01D 67/0079

*Primary Examiner* — Chinessa T. Golden
(74) *Attorney, Agent, or Firm* — J. Clinton Wimbish; Maynard Nexsen PC (57) ABSTRACT

A multilayer membrane comprising at least two co-extruded layers where the two co-extruded layer contain different polymers and one of the two co-extruded layers contains an extrusion additive. Examples of useful extrusion additives may include a nucleating agent or a pore-forming particulate. A method for making the membrane is also disclosed. Using an extrusion additive when co-extruding two different polymers avoids some of the drawbacks associated with processes involving the co-extrusion of different polymers, particularly processes where a co-extruded non-porous precursor is later stretched to form pores. For example, the drawback of lower permeability, difficulty to make lower Gurley, and splittiness may be improved.

20 Claims, 3 Drawing Sheets

(51) Int. Cl.
  *B32B 27/20* (2006.01)
  *B32B 37/15* (2006.01)
(52) U.S. Cl.
  CPC ........ *B32B 37/153* (2013.01); *B32B 2250/03* (2013.01); *B32B 2250/242* (2013.01); *B32B 2264/10* (2013.01); *B32B 2305/026* (2013.01); *B32B 2315/00* (2013.01); *B32B 2323/043* (2013.01); *B32B 2323/10* (2013.01)

(56) References Cited

U.S. PATENT DOCUMENTS

2018/0316049 A1   11/2018  Hasegawa et al.
2020/0161618 A1*   5/2020  Adams ................ H01M 50/454

\* cited by examiner

MULTILAYER POROUS MEMBRANES AND METHODS OF MAKING THE SAME

CROSS REFERENCE TO RELATED APPLICATIONS

This application is a 371 U.S. application claiming priority to PCT/US2021/040395, filed Jul. 5, 2021, which claims priority to U.S. Provisional Patent Application Ser. No. 63/048,661, filed Jul. 7, 2020, which is hereby fully incorporated by reference herein.

FIELD

This application relates generally to multilayer porous membranes that comprise at least two adjacent layers that have differing compositions. More specifically, this application relates to multilayer membranes where the two adjacent layers having differing compositions are coextruded layers or otherwise simultaneously processed layers. The multilayer porous membranes described herein may be microporous, nanoporous, or macroporous. The multilayer porous membranes described herein may be useful as battery separators, textiles, or filters.

This application also generally relates to an improved method for forming a multilayer membrane that comprises at least two adjacent layers with differing compositions.

BACKGROUND

Co-extrusion of two or more different resin compositions present some known challenges. For example, co-extruding two or more resin compositions where the crystallization temperature ($T_c$) varies by 10° C. or more presents some known challenges. These known challenges are believed to stem from the fact that a single processing temperature must be chosen, and often the chosen temperature is one that is good for the more abundant resin composition to be processed. However, this temperature is not ideal for processing of the less abundant resin composition.

One example of a product formed by the co-extrusion of two or more resin compositions is a coextruded shutdown separator having a structure PP/PE/PP, where PP denotes a layer mainly comprising polypropylene with a $T_c$ of about 165° C., and PE denotes a layer mainly comprising polyethylene, with a $T_c$ centering around 120° C. to 135° C. Commonly, the PP/PE/PP structure comprises more PP than PE. Consequently, this product is typically co-extruded at temperatures more favorable to polypropylene, which may result in some film deficiencies. One such deficiency believed to be caused by these less than ideal processing conditions is lower permeability or difficulty to reach lower Gurley.

Thus, a method for alleviating the above-mentioned challenges of co-extruding two or more different resin compositions may be desirable.

SUMMARY

In one aspect, an extruded multilayer microporous membrane is described. The extruded multilayer microporous membrane may comprise the following (1) one layer that mainly comprises a polymer A, and (2) an adjacent layer that mainly comprises a polymer B, which has a higher or lower $T_c$ than polymer A, and that also comprises an extrusion additive. In some embodiments, the extruded multilayer microporous membrane may comprise a layer comprising mainly polymer A, an adjacent layer comprising mainly a polymer B and an extrusion additive, and a layer adjacent to the adjacent layer comprising mainly a polymer B. The layer adjacent to the layer mainly comprising polymer B may comprise mainly polymer A. For example, in some embodiments the extruded microporous membrane may have a structure A/B, A/B/A, B/A/B, A/B/B/A, B/A/A/B, A/B/A/B, A/B/A/B/A, or variations thereof.

In some embodiments, the polymer B has Tc that is at least 10 degrees, at least 20 degrees, at least 30 degrees, or at least 40 degrees less than the Tc of polymer A. For example, in such an embodiment, polymer A may comprise, consist of, or consist essentially of a polypropylene homopolymer, copolymer, or terpolymer or a polymer blend containing a polypropylene homopolymer, copolymer, or terpolymer. Polymer B may comprise, consist of, or consist essentially of a polyethylene homopolymer, copolymer, or terpolymer or is a polymer blend containing a polyethylene homopolymer, copolymer, or terpolymer.

In some different embodiments, the polymer B has Tc that is at least 10 degrees, at least 20 degrees, at least 30 degrees, or at least 40 degrees more than the Tc of polymer A. For example, in such an embodiment, polymer B may comprise, consist of, or consist essentially of a polypropylene homopolymer, copolymer, or terpolymer or a polymer blend containing a polypropylene homopolymer, copolymer, or terpolymer. Polymer A may comprise, consist of, or consist essentially of a polyethylene homopolymer, copolymer, or terpolymer or is a polymer blend containing a polyethylene homopolymer, copolymer, or terpolymer.

For example, in some embodiments, the extruded microporous membrane may comprise a layer structure selected from the following PP/PE, PP/PE/PP, PE/PP/PPP, PP/PE/PE/PP, PE/PP/PP/PE, PP/PE/PE/PE/PP, PE/PP/PP/PP/PE, PP/PE/PE/PE/PE/PP, PE/PP/PP/PP/PP/PE, PP/PE/PE/PE/PE/PE/PP, PE/PP/PP/PP/PP/PP/PE, PP/PE/PE/PE/PE/PE/PE/PP, PE/PP/PP/PP/PP/PP/PP/PE, PP/PE/PE/PE/PE/PE/PE/PE/PP, PE/PP/PP/PP/PP/PP/PP/PP/PE, PP/PE/PE/PE/PE/PE/PE/PE/PE/PP, PE/PP/PP/PP/PP/PP/PP/PP/PP/PE, PP/PE/PE/PE/PE/PE/PE/PE/PE/PE/PP, PE/PP/PP/PP/PP/PP/PP/PP/PP/PP/PE, or PE/PP/PP/PP/PP/PP/PP/PP/PP/PP/PP/PE.

PP as used above is a layer comprising mainly polypropylene homopolymer, copolymer, or terpolymer or is a polymer blend containing a polypropylene homopolymer, copolymer, or terpolymer;

PE as used above is a layer comprising mainly polyethylene homopolymer, copolymer, or terpolymer or is a polymer blend containing a polyethylene homopolymer, copolymer, or terpolymer. In some embodiments, PE may be a high density (HD) PE, an ultra-high molecular weight (UHMW) PE, a high molecular weight (HMW) PE, or a blend thereof, and in some embodiments, the UHMW PE or the HMW PE may be blended with a lower molecular weight PE.

The extrusion additive may in some embodiments be at least one of a nucleating agent that raises or lowers the Tc of polymer B and a pore-forming particulate that allows pores to be formed in the layer comprising polymer B without crystallizing polymer B or allows pores to be formed in the layer comprising polymer B when using a processing temperature that is more than ten degrees higher or lower than the Tc of polymer B.

In some preferred embodiments, the extrusion additive included with polymer B may be a nucleating agent that raises the $T_c$ of polymer B from about 5 to about 30 degrees, from about 10 to about 25 degrees, from about 10 to about 20 degrees, from about 10 to about 15 degrees, or from about 5 to about 10 degrees.

In some other preferred embodiments, the extrusion additive may be an organic pore-forming particulate, an inorganic pore-forming particulate, or a combined organic-inorganic pore-forming particulate that enables pores to be formed in the layer comprising polymer B without crystallizing polymer B or that enables pores to be formed in the layer comprising polymer B at a processing temperature that is more than ten degrees higher or lower than the Tc of polymer B. The layer comprising polymer B and the particles can be made porous using a particle stretch process. For example, an exemplary particle-stretch process is disclosed in A. Qaiss, et al., *Porosity Formation by Biaxially Stretching in Polyolefin Films Filled with Calcium Carbonate Particles*, Applied Polymer Science, Vol. 16, Issue 6, March 2012, which is incorporated by reference herein in its entirety.

In some embodiments, the extruded multilayer microporous membrane is extruded as part of a cast-film extrusion process or a blown-film extrusion process. In preferred embodiments, the membrane is co-extruded. A co-extruded multilayer product will be different than a multilayer product formed by laminating, rather than co-extruding two or more layers together. For example, the layer-to-layer adhesion of a co-extruded product will be much higher than that in a laminated product.

The extruded multilayer microporous membrane film is preferably a dry process membrane.

The extruded multilayer microporous membrane may have at least one of slit-shaped pores, round pores, substantially round pores, trapezoidal pores, and irregularly shaped pores.

In another aspect, a method for forming an extruded microporous membrane, particularly like those described herein is disclosed. The method may comprise a step of coextruding a first polymeric composition comprising mainly a polymer A and a second polymeric composition mainly comprising a polymer B, which has a lower $T_c$ than polymer A, wherein the second polymeric composition also comprises an extrusion additive. Polymer A, Polymer B, and the extrusion additive are as described herein.

The method may be a cast film extrusion method or a blown film extrusion method. The method is preferably a dry process method, but may be a wet (utilizing solvent, oils, or both) or semi-wet (utilizing small amounts of solvent, oils, or both) method.

DETAILED DESCRIPTION

Disclosed herein is an improved porous membrane for use as or in a battery separator, textile, filter, or the like. Also disclosed herein is a method for forming the same.
Membrane The improved porous membrane is not so limited, but preferably comprises, consists of, or consists essentially of at least two adjacent layers that have been co-extruded. The thickness of the at least two adjacent co-extruded layers are not so limited and may vary from 0.1 to 100 microns each and independently of one another. In some preferred embodiments, the thickness may vary from 0.1 to 50 microns, from 0.1 to 40 microns, from 0.1 to 30 microns, from 0.1 to 25 microns, from 0.1 to 20 microns, from 0.1 to 15 microns, from 0.1 to 10 microns, or from 0.1 to 5 microns. The thickness of the porous membrane may be from about 0.5 microns to about 100 microns, from about 1 to 50 microns, from about 1 to about 40 microns, from about 1 to about 30 microns, from about 1 to about 25 microns, from about 1 to about 20 microns, from about 1 to about 15 microns, from about 1 to about 10 microns, or from about 1 to about 5 microns.

Exemplary porous membranes that may be formed according to the invention disclosed herein are disclosed in, for example, WO 2018/089748, U.S. Pat. No. 10,003,058, and US2018/0134024, which are incorporated by reference herein in their entirety. The porous membrane may be microporous, nanoporous, or macroporous. The shape of at least one of the pores may be slit-shaped, round shaped, rounded, asymmetrical, or trapezoidal. In some preferred embodiments, the porous membrane may be a porous membrane formed by a dry process such as the Celgard® dry stretch process. A dry process is one that does not involve the use of solvent or oil. A typical dry process may comprise, consist of, or consist essentially of an extrusion step, an annealing step, and a stretching step. In a typical dry process, the stretching step is used to form pores, but formation of pores may be, in some embodiments, aided by the use of particles. When particles are used, this may be called a dry particle stretch process. The stretching step in a typical dry stretch process or in a dry particle stretch process may comprise, consist of, or consist essentially of stretching in the machine direction (MD), the transverse direction (TD), or stretching in both the MD and TD. Stretching also be done at an angle to the MD or TD. In some other embodiments, the porous membrane may be one formed by a wet or semi-wet process that involves the use of oils or solvents.

One of the at least two adjacent co-extruded layers may comprise, consist of, or consist essentially of a first polymer A, and the other of the two adjacent co-extruded layers may comprise, consist of, or consist essentially of a polymer B, which is different than polymer A, and an extrusion additive. Different may mean that polymer B has a different melting point, crystallization temperature (Tc), viscosity, melt flow index (MFI), etc. An extrusion additive is any component that may make co-extrusion of the two adjacent co-extruded layers more favorable. For example, if polymer A and polymer B have different crystallization temperatures, the extrusion additive will help lessen the difference. For example, the extrusion additive may be added to the polymer component with the lower Tc to elevate the crystallization temperature of polymer component with lower Tc. This would minimize the gap of Tc for the two polymers and make two polymers closer to simultaneous crystallization. Therefore, there would be better orientation. In some other embodiments, the extrusion additive may be a pore-forming particulate that, when added to one of the co-extruded layers, may allow pores to be formed in that layer using a dry particle stretch process. Crystallization of that layer will not be necessary to form pores therein and the layers could be co-extruded at a temperature favorable to the layer that does not contain the particulate while still being able to form pores in the layer that includes the particulate.

In one possibly preferred embodiment described herein polymer B may be a homopolymer, copolymer, terpolymer or polymer blend of two or more different polymers that has a crystallization temperature ($T_c$) that is at least 5 degrees, at least 10 degrees, at least 15 degrees, at least 20 degrees, at least 25 degrees, at least 30 degrees, at least 35 degrees, at least 40 degrees, at least 45 degrees, or at least 50 degrees higher or lower than the crystallization temperature ($T_c$) of polymer A. Polymer A is also a homopolymer, copolymer, terpolymer, or polymer blend of two or more different homopolymers, copolymers, terpolymers, etc. In such an embodiment, the extrusion additive may be a compound that raises or lowers the crystallization temperature of polymer B so that there is less difference between the crystallization temperature of polymer A and polymer B. For example, the difference in crystallization temperature between polymer A and Polymer B may be 30 degrees without the addition of the extrusion additive to polymer B, but with the extrusion additive, the difference may be less than 10 degrees.

Figure 1:
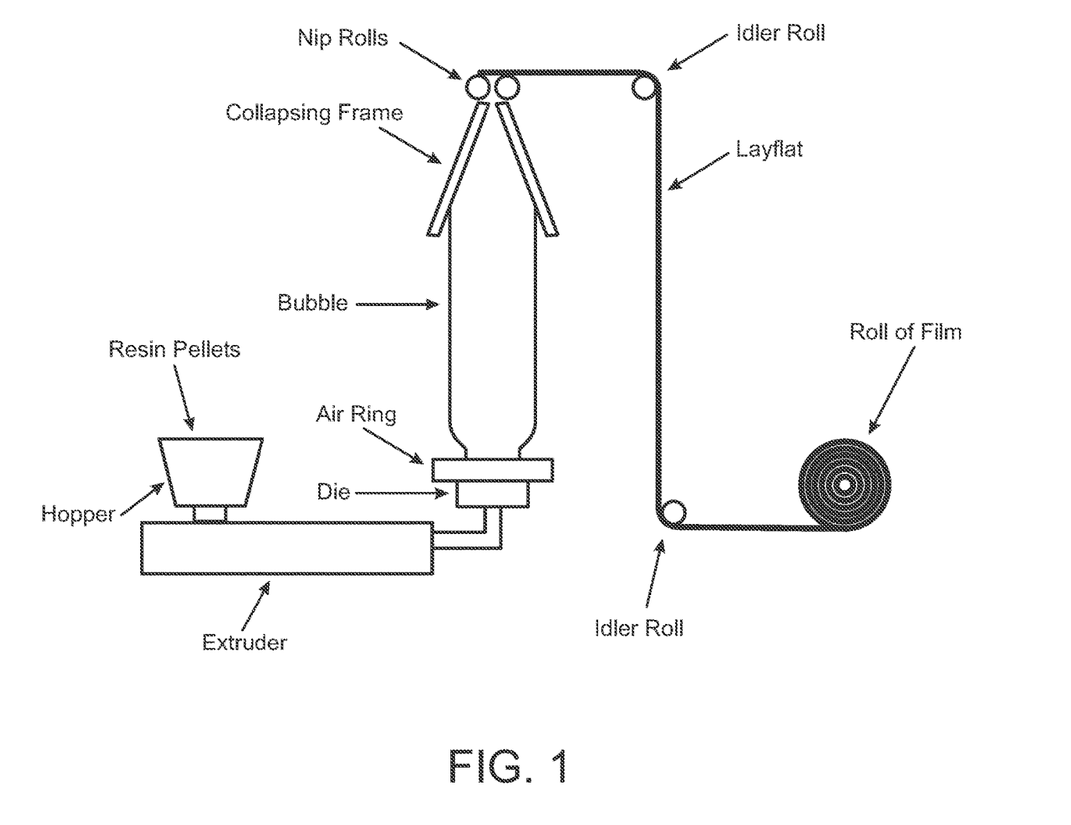
FIG. 1 is an exemplary blown film extrusion line for a blown film extrusion process.
Figure 2:
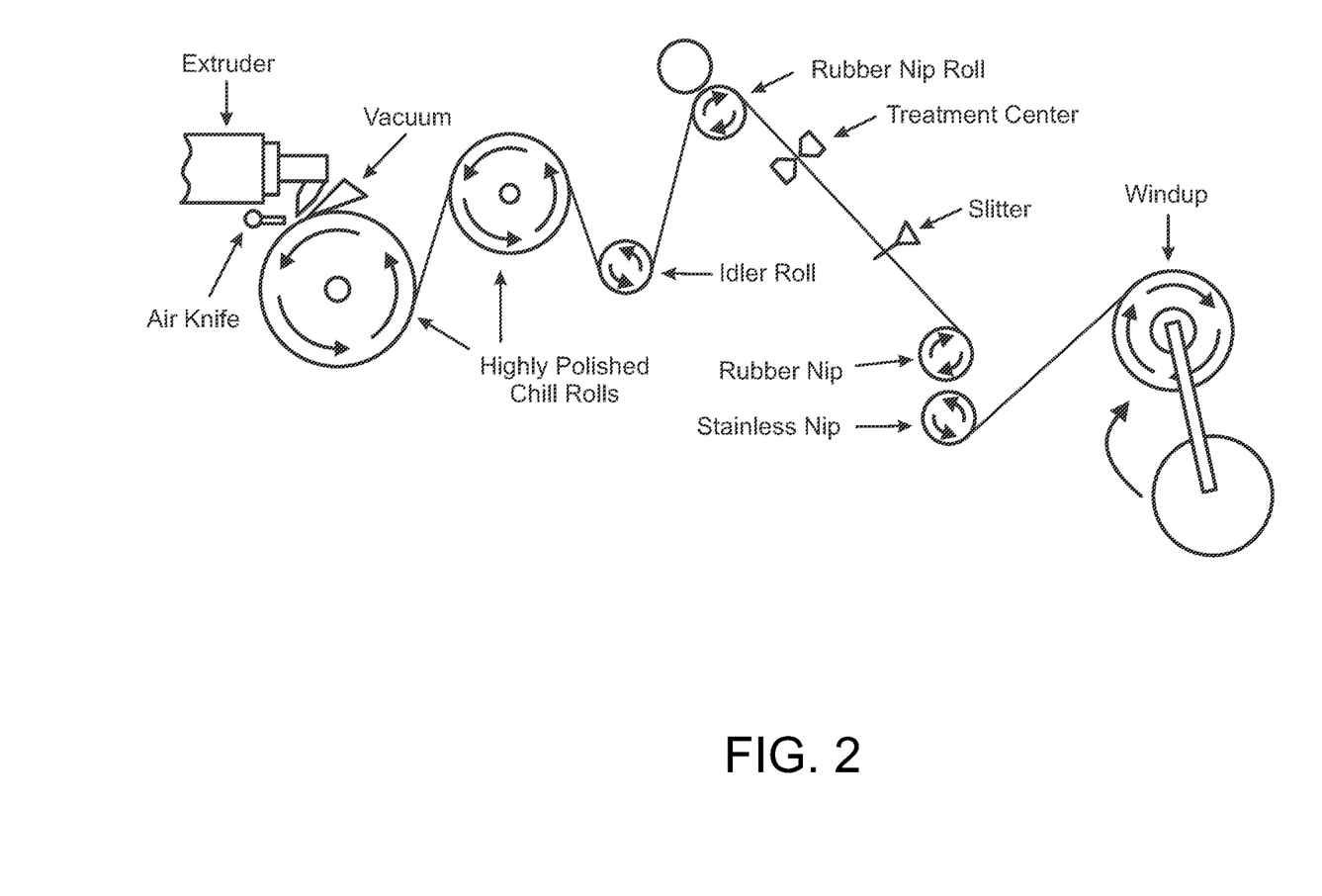
FIG. 2 is an exemplary cast film extrusion line for a cast film extrusion process
Figure 3:
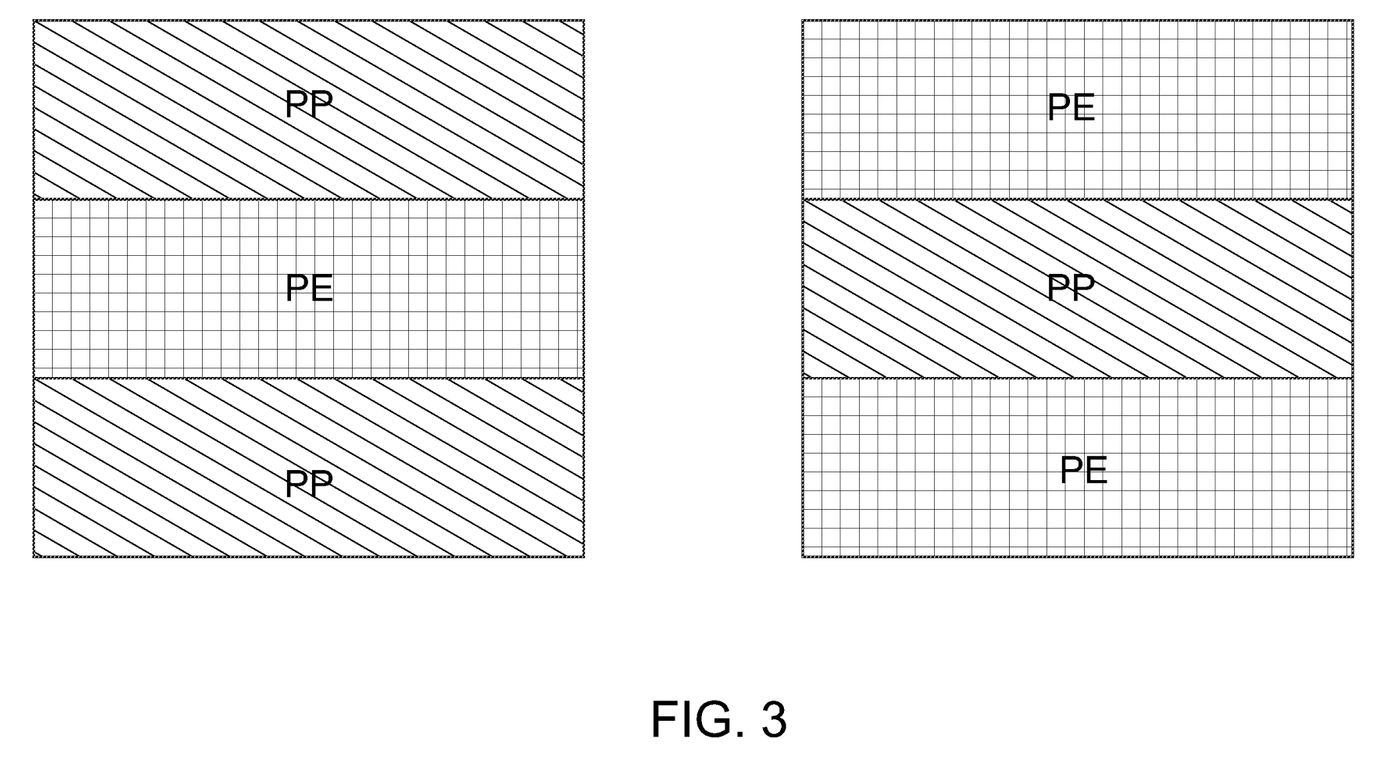
FIG. 3 is a schematic view of co-extruded films as described herein.

In one possibly preferred embodiment, layers comprising polymer B and an extrusion additive are internal layers, not external or exposed layers of the membrane. For example, in FIG. 3, the middle membrane shows the layer comprising polymer B and the extrusion additive as an internal, not an external or exposed layer. In the other two membranes in FIG. 3, the layer comprising polymer B is an external or exposed layer. Without wishing to be bound by any particular theory, it is believed that addition of the extrusion additive in an internal layer may be preferable because addition in an external or exposed layer may negatively affect the surface characteristics of the membrane depending on the desired use of the membrane, e.g., as a battery separator, as a base for a coated battery separator, as a textile, as a textile material for medical use such as in masks, gowns, blankets, etc, as a filter, or the like. For example, addition of nucleating agents as extrusion additives in an external layers may increase the coefficient of friction, which is not ideal if the membrane is to be used as a battery separator, particularly. However, if the membrane is used as a house wrap or roofing underlayment, the increased coefficient of friction may be a good thing. It may help the wrap "grip" the house or provide "tread" on the roofing underlayment to minimize slipping.

For example, in one exemplary embodiment, Polymer A may be a homopolymer, copolymer, or terpolymer of polypropylene having a $T_c$ around 160-165° C. Polymer A may also be a blend of a homopolymer, copolymer, or terpolymer of polypropylene with at least one additional polymer. The blend may have a $T_c$ around 160 to 165° C. Polymer B in this embodiment may be a homopolymer, copolymer, or terpolymer of polyethylene having a $T_c$ around 120 to 150° C. or around 120° C. to 135° C. Polymer B may also be a blend of a homopolymer, copolymer, or terpolymer of polyethylene with at least one additional polymer. The blend may have a $T_c$ around 120 to 150° C. or around 120° C. to 135° C. In this embodiment, the extrusion additive may be a nucleating agent or another compound capable of raising the $T_c$ of polyethylene from 5 to 45 degrees, from 5 to 40 degrees, from 5 to 35 degrees, from 5 to 30 degrees, from 5 to 25 degrees, from 5 to 20 degrees, from 5 to 15 degrees, or from 5 to 10 degrees. Some suitable nucleating agents for polyethylene may include those sold as CRYSTALADD® by Entec, Hyperform® by Milliken, or NA-11, by Amfine Chemical (part of Mitsubishi Corp). In this embodiment, the extrusion additive may also be an inorganic pore-forming particulate, an organic pore-forming particulate, or a combined inorganic-organic pore-forming particulate. The chemical composition of the particulate is not so limited as long as it can be used to help with pore formation in a dry particle stretch process. Some exemplary inorganic particulates may comprise, consist of, or consist essentially of at least one of alumina, boehmite, talc, barium sulfate, titania, calcium carbonate, and mixtures thereof. An example of an organic-inorganic particulate may be a polymer coated inorganic particle such as a polyethylene coated inorganic particle. The size of the particle is not so limited and may be a nano-sized or micro-sized. The size distribution of the particulate may be narrow or broad. Without wishing to be bound by any particular theory, it is believed that a narrow or controlled pore size distribution would result in consistent pore size in the film and a broader particle size distribution will result in more randomness in the final pore sizes. A more controlled pore size may be more preferable for a battery separator where safety is a top concern. Smaller and more controlled pore sizes may result in a safer battery separator due to increased ability to control lithium dendrite formation and/or growth. However, a more random pore size distribution may be more preferable in other applications.

The porous membrane described herein may be used alone as a battery separator, textile, filter, or the like, or it may be used in combination with at least one additional film or layer. In some embodiments, the additional layer may be a coating provided on one or both faces of the porous membrane. For battery applications, the coating may be a ceramic coating, heat-resistant coating, adhesive or sticky coating, a shutdown coating, a surface-modifying coating, or the like. For filter applications, the coating may be one that changes the hydrophilicity of the membrane, provides antifouling, or the like. For textile applications, the coating may be one that affects the stain-resistance, waterproofness, strength, or the like of the membrane. In some embodiments, the additional layer may be a woven layer, a non-woven layer, another porous membrane, a fabric, or the like.

Method

The method described herein is not so limited, but must at least comprise, consist of, or consists essentially of a step of co-extruding two or more different polymeric compositions. The polymeric compositions may comprise, consist of, or consist essentially of homopolymers, copolymers, terpolymers, or polymer blends. For example, two different homopolymers may be coextuded, a homopolymer and a polymer blend may be coextruded, two different polymer blends may be co-extruded, a copolymer and a terpolymer may be co-extruded, two different copolymers may be co-extruded, or the like. At least one of the two or more different co-extruded polymeric compositions may comprise an extrusion additive. In preferred embodiments, the two or more different polymeric compositions are co-extruded to form the at least two adjacent layers having compositions as described herein above.

In some embodiments, the method will further comprise, consist of, or consist essentially of at least one of an annealing step or a stretching step. The stretching step may comprise unidirectional stretching, bidirectional stretching, or multidirectional stretching. For example, the stretching may involve a machine direction (MD) stretching step and a transverse direction (TD) stretching step, only a MD stretching step, or the like.

In some preferred embodiments, the method described herein is a dry process such as the Celgard® dry-stretch process. A dry process is one that does not use solvents or oils, but may or may not use particulates as pore-forming aids, i.e., pore-forming particulates. In some embodiments, the process may be a wet or semi-wet process that uses varying amounts of solvents or oils.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" may be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

EXAMPLES

Example 1

In Example 1, a PP-containing layer and a PE-containing layer are co-extruded at a temperature favorable to the PP-containing layer, about 240-250° C. instead of about 210-220° C., which would be favorable to the PE-containing layer. Air-quenching after the film is extruded will force the PP to crystalize at 150-160° C. The PE-containing layer contains a nucleating agent that raises the crystallization temperature of that layer by 10 degrees or more above the typical 120-130° C.

Example 2

Example 2 is similar to Example 1 except that the PE is an HDPE, UHMW PE, a HMW PE, or a blend containing an UHMW PE and/or a HMW PE. In this embodiment, the initial difference, i.e., before adding the nucleating agent, between the Tc of the PP-containing layer and the PE-containing layer is smaller than in Example 1.

Example 3

Example 3 is like Example 1 except that a PP-containing layer, a PE-containing layer, and a PP-containing layer are co-extruded in that order.

Example 4

Example 4 is like Example 1 except that a PE-containing layer, a PP-containing layer, and a PE-containing layer are co-extruded in that order.

Example 5

Example 5 is like Example 2, except that a PP-containing layer, a PE-containing layer, and a PP-containing layer are co-extruded in that order.

Example 6

Example 6 is like Example 2 except that a PE-containing layer, a PP-containing layer, and a PE-containing layer are co-extruded in that order.

In Examples 1 to 6 a conventional dry-stretch process is used where stretching is used to form the pores in each layer of the structures.

Example 7

In Example 7, a PP-containing layer and a PE-containing layer are co-extruded at a temperature favorable to the PP-containing layer. The PE-containing layer comprises an inorganic particulate such as Barium Sulfate or Calcium Carbonate. After the layers are co-extruded, the co-extruded layers are stretched. In the PE-containing layer, the particles help initiate pore formation when the layers are stretched. In the PP-containing layer, pores are formed along crystalline interfaces when the layers are stretched. The particulate may have a polymer coating.

Example 8

Example 8 is like Example 7 except that a PP-containing layer, a PE-containing layer, and a PP-containing layer are co-extruded in that order.

Example 9

Example 9 is like Example 7 except that a PE-containing layer, a PP-containing layer, and a PE-containing layer are co-extruded in that order.

Example 10

Example 10 is like Example 7 except that the particulate is added to the PP-containing layer and the layers are co-extruded at a temperature favorable to the PE-containing layer.

Example 11

Example 11 is like Example 10 except that a PP-containing layer, a PE-containing layer, and a PP-containing layer are co-extruded in that order.

Example 12

Example 12 is like Example 11 except that a PE-containing layer, a PP-containing layer, and a PE-containing layer are co-extruded in that order.

In examples 7-12, the pores of the layers containing the pore-forming particulate are formed by a dry particle stretch process. The pores of the layers that do not contain the pore-forming particulate are formed by a traditional dry stretch mechanism. All layers are extruded and stretched together, but the mechanism by which the pores are formed is different among the layers.

What is claimed is:
1. An extruded multilayer microporous membrane comprising:
   at least one layer that mainly comprises a polymer A, wherein polymer A has a crystallization temperature ($T_c$); and
   at least one adjacent layer that mainly comprises a polymer B, which is different than polymer A, and that also comprises an extrusion additive, wherein polymer B has a $T_c$ that is different from the $T_c$ of polymer A, and wherein
   polymer B has a $T_c$ that is ten degrees or more, twenty degrees or more, thirty degrees or more, or forty degrees or more different than the $T_c$ of polymer A; and
   the one layer and the adjacent layer are co-extruded.
2. The extruded multilayer microporous membrane of claim 1, wherein polymer B has a $T_c$ that is ten degrees or lower than the $T_c$ of polymer A.
3. The extruded multilayer microporous membrane of claim 1, wherein polymer A is a polypropylene homopolymer, copolymer, or terpolymer or is a polymer blend containing a polypropylene homopolymer, copolymer, or terpolymer.
4. The extruded multilayer microporous membrane of claim 3, wherein polymer B is a polyethylene homopolymer, copolymer, or terpolymer or is a polymer blend containing a polyethylene homopolymer, copolymer, or terpolymer.

5. The extruded multilayer microporous membrane of claim 1, wherein polymer B is a polyethylene homopolymer, copolymer, or terpolymer or is a polymer blend containing a polyethylene homopolymer, copolymer, or terpolymer.

6. The extruded multilayer microporous membrane of claim 1, wherein the extrusion additive is a nucleating agent that raises or lowers the $T_c$ of polymer A by about 5 to about 30 degrees, by about 10 to about 25 degrees, by about 10 to about 20 degrees, by about 10 to 15 degrees, or by about 5 to 10 degrees.

7. The extruded multilayer microporous membrane of claim 1, having the following:
the at least one layer that mainly comprises a polymer A;
the at least one adjacent layer that comprises mainly a polymer B, which is different than polymer A, and an extrusion additive; and
another layer, which is adjacent to the adjacent layer that comprises mainly a polymer B and an extrusion additive, and which itself mainly comprises the polymer A.

8. The extruded multilayer microporous membrane of claim 1, wherein the membrane is extruded as part of a cast-film extrusion process or a blown-film extrusion process.

9. The extruded multilayer microporous membrane film of claim 1, wherein the membrane is a dry process membrane.

10. The extruded multilayer microporous membrane of claim 1, wherein pores of the membrane are at least one of slit-shaped, round, trapezoidal, and irregularly or asymmetrically shaped.

11. The extruded microporous membrane of claim 1, comprising a layer structure selected from the following: PP/PE, PP/PE/PP, PP/PE/PE/PP, PP/PE/PE/PE/PP, PP/PE/PE/PE/PE/PP, PP/PE/PE/PE/PE/PE/PP, PP/PE/PE/PE/PE/PE/PP, PP/PE/PE/PE/PE/PE/PE/PP, PP/PE/PE/PE/PE/PE/PE/PE/PP, PP/PE/PE/PE/PE/PE/PE/PE/PE/PP, PP/PE/PE/PE/PE/PE/PE/PE/PE/PE/PP, PP/PP/PE/PP/PP, PP/PE/PE/PP, PP/PE/PE/PE/PP, PP/PE/PE/PE/PP, PP/PP/PE/PE/PE/PE/PE/PP/PP, PP/PP/PE/PE/PE/PE/PE/PP/PP, PP/PE/PP/PP, PP/PP/PE/PE/PE/PE/PE/PE/PP/PP, PP/PP/PE/PE/PE/PE/PE/PE/PE/PP/PP, PP/PP/PE/PE/PE/PE/PE/PE/PE/PE/PP/PP, PP/PP/PE/PE/PE/PE/PE/PE/PE/PE/PE/PP/PP, or PP/PP/PE/PE/PE/PE/PE/PE/PE/PE/PE/PE/PP/PP; PP/PP/PP/PE/PP/PP/PP, PP/PP/PP/PE/PE/PP/PP/PP, PP/PP/PP/PE/PE/PE/PP/PP/PP, PP/PP/PP/PE/PE/PE/PE/PP/PP/PP, PP/PP/PP/PE/PE/PE/PE/PP/PP/PP, PP/PP/PP/PE/PE/PE/PE/PE/PP/PP/PP, PP/PP/PP/PE/PE/PE/PE/PE/PE/PP/PP/PP, PP/PP/PP/PE/PE/PE/PE/PE/PE/PE/PP/PP/PP, PP/PP/PP/PE/PE/PE/PE/PE/PE/PE/PE/PP/PP/PP, or PP/PP/PP/PE/PE/PE/PE/PE/PE/PE/PE/PE/PP/PP/PP; PP/PP/PP/PP/PE/PP/PP/PP/PP, PP/PP/PP/PP/PE/PE/PP/PP/PP/PP, PP/PP/PP/PP/PE/PE/PE/PP/PP/PP/PP, PP/PP/PP/PP/PE/PE/PE/PE/PP/PP/PP/PP, PP/PP/PP/PP/PE/PE/PE/PE/PE/PP/PP/PP/PP, PP/PP/PP/PP/PE/PE/PE/PE/PE/PE/PP/PP/PP/PP, PP/PP/PP/PP/PE/PE/PE/PE/PE/PE/PE/PP/PP/PP/PP, PP/PP/PP/PP/PE/PE/PE/PE/PE/PE/PE/PE/PP/PP/PP/PP, PP/PP/PP/PP/PE/PE/PE/PE/PE/PE/PE/PE/PE/PP/PP/PP/PP, or PP/PP/PP/PP/PE/PE/PE/PE/PE/PE/PE/PE/PE/PE/PP/PP/PP/PP
wherein
PP is a layer comprising mainly polypropylene homopolymer, copolymer, or terpolymer or is a polymer blend containing a polypropylene homopolymer, copolymer, or terpolymer;
PE is a layer comprising mainly polyethylene homopolymer, copolymer, or terpolymer or is a polymer blend containing a polyethylene homopolymer, copolymer, or terpolymer;
at least one PE in each structure comprises an extrusion additive; and wherein
the at least one PE with an extrusion additive is coextruded with at least one PP.

12. The porous membrane of claim 11, wherein the extrusion additive is a pore-forming particulate having an average particle size from 10 nanometers to 1 micron and being selected from the following: an organic pore-forming particulate, an inorganic pore-forming particulate, and an organic-inorganic pore-forming particulate.

13. The extruded microporous membrane of claim 1, comprising a layer structure selected from the following: PP/PE, PP/PE/PP, PP/PE/PE/PP, PP/PE/PE/PE/PP, PP/PE/PE/PE/PE/PP, PP/PE/PE/PE/PE/PE/PP, PP/PE/PE/PE/PE/PE/PE/PP, PP/PE/PE/PE/PE/PE/PE/PE/PP, PP/PE/PE/PE/PE/PE/PE/PE/PE/PP, PP/PE/PE/PE/PE/PE/PE/PE/PE/PE/PP, PP/PP/PE/PP/PP, PP/PE/PE/PP, PP/PE/PE/PE/PP, PP/PE/PE/PE/PP, PP/PP/PE/PE/PE/PE/PE/PP/PP, PP/PP/PE/PE/PE/PE/PE/PP/PP, PP/PE/PP/PP, PP/PP/PE/PE/PE/PE/PE/PE/PP/PP, PP/PP/PE/PE/PE/PE/PE/PE/PE/PP/PP, PP/PP/PE/PE/PE/PE/PE/PE/PE/PE/PP/PP, PP/PP/PE/PE/PE/PE/PE/PE/PE/PE/PE/PP/PP, or PP/PP/PE/PE/PE/PE/PE/PE/PE/PE/PE/PE/PP/PP; PP/PP/PP/PE/PP/PP/PP, PP/PP/PP/PE/PE/PP/PP/PP, PP/PP/PP/PE/PE/PE/PP/PP/PP, PP/PP/PP/PE/PE/PE/PE/PP/PP/PP, PP/PP/PP/PE/PE/PE/PE/PP/PP/PP, PP/PP/PP/PE/PE/PE/PE/PE/PP/PP/PP, PP/PP/PP/PE/PE/PE/PE/PE/PE/PP/PP/PP, PP/PP/PP/PE/PE/PE/PE/PE/PE/PE/PP/PP/PP, PP/PP/PP/PE/PE/PE/PE/PE/PE/PE/PE/PP/PP/PP, or PP/PP/PP/PE/PE/PE/PE/PE/PE/PE/PE/PE/PP/PP/PP; PP/PP/PP/PP/PE/PP/PP/PP/PP, PP/PP/PP/PP/PE/PE/PP/PP/PP/PP, PP/PP/PP/PP/PE/PE/PE/PP/PP/PP/PP, PP/PP/PP/PP/PE/PE/PE/PE/PP/PP/PP/PP, PP/PP/PP/PP/PE/PE/PE/PE/PE/PP/PP/PP/PP, PP/PP/PP/PP/PE/PE/PE/PE/PE/PE/PP/PP/PP/PP, PP/PP/PP/PP/PE/PE/PE/PE/PE/PE/PE/PP/PP/PP/PP, PP/PP/PP/PP/PE/PE/PE/PE/PE/PE/PE/PE/PP/PP/PP/PP, PP/PP/PP/PP/PE/PE/PE/PE/PE/PE/PE/PE/PE/PP/PP/PP/PP, or PP/PP/PP/PP/PE/PE/PE/PE/PE/PE/PE/PE/PE/PE/PP/PP/PP/PP
wherein
PP is a layer comprising mainly polypropylene homopolymer, copolymer, or terpolymer or is a polymer blend containing a polypropylene homopolymer, copolymer, or terpolymer;
PE is a layer comprising mainly polyethylene homopolymer, copolymer, or terpolymer or is a polymer blend containing a polyethylene homopolymer, copolymer, or terpolymer;
at least one PP in each structure comprises an extrusion additive; and wherein
the at least one PP with an extrusion additive is coextruded with at least one PE.

14. The porous membrane of claim 13, wherein the extrusion additive is a pore-forming particulate having an average particle size from 10 nanometers to 1 micron and being selected from the following: an organic pore-forming particulate, an inorganic pore-forming particulate, and an organic-inorganic pore-forming particulate.

15. The extruded multilayer microporous membrane of claim 1, wherein polymer B has a $T_c$ that is thirty degrees or more different than the $T_c$ of polymer A.

16. The extruded multilayer microporous membrane of claim 1, wherein polymer B has a $T_c$ that is forty degrees or more different than the $T_c$ of polymer A.

17. The extruded multilayer microporous membrane of claim 1, wherein the extruded multilayer microporous membrane comprises at least three layers inclusive of the at least one layer and the at least one adjacent layer, and wherein all layers of the extruded multilayer microporous membrane are co-extruded.

18. An extruded multilayer microporous membrane comprising:
- at least one layer that mainly comprises a polypropylene, wherein the polypropylene has a crystallization temperature ($T_c$); and
- at least one adjacent layer that mainly comprises a high density (HD), high molecular weight (HMW) or ultra-high molecular weight (UHMW) polyethylene and an extrusion additive, wherein the polyethylene has $T_c$ that is different from the $T_c$ of the polypropylene, and wherein
- the polyethylene has a $T_c$ that is ten degrees or more, twenty degrees or more, thirty degrees or more, or forty degrees or more different than the $T_c$ of the polypropylene; and
- the at least one layer and the at least one adjacent layer are co-extruded, wherein the extrusion additive may be a nucleating agent.

19. The extruded multilayer microporous membrane of claim 18, wherein the polyethylene has a $T_c$ that is thirty degrees or more different than the $T_c$ of the polypropylene.

20. The extruded multilayer microporous membrane of claim 18, wherein the polyethylene has a $T_c$ that is forty degrees or more different than the $T_c$ of the polypropylene.

* * * * *